US008364572B2

(12) United States Patent
Abdulali

(10) Patent No.: US 8,364,572 B2
(45) Date of Patent: Jan. 29, 2013

(54) METHOD AND SYSTEM FOR EVALUATING PRICING OF ASSETS

(75) Inventor: Adil Abdulali, New York, NY (US)

(73) Assignee: Protégé Partners, LLC, New York, NY (US)

( * ) Notice: Subject to any disclaimer, the term of this patent is extended or adjusted under 35 U.S.C. 154(b) by 217 days.

(21) Appl. No.: 11/941,218

(22) Filed: Nov. 16, 2007

(65) Prior Publication Data

US 2008/0120253 A1    May 22, 2008

Related U.S. Application Data

(60) Provisional application No. 60/859,838, filed on Nov. 16, 2006.

(51) Int. Cl.
 *G06Q 40/00* (2006.01)
(52) U.S. Cl. .................. 705/37; 705/36; 703/2
(58) Field of Classification Search ................ 705/7, 36, 705/37; 703/2
 See application file for complete search history.

(56) References Cited

U.S. PATENT DOCUMENTS

| 7,333,923 B1* | 2/2008 | Yamanishi et al. ................ 703/2 |
| 7,349,878 B1* | 3/2008 | Makivic ........................... 705/37 |
| 2002/0156714 A1* | 10/2002 | Gatto ............................. 705/36 |
| 2004/0210502 A1 | 10/2004 | Madhavan | |
| 2005/0049956 A1* | 3/2005 | Ballman ......................... 705/37 |
| 2005/0273414 A1 | 12/2005 | Michaud | |
| 2006/0195375 A1 | 8/2006 | Bohn | |

OTHER PUBLICATIONS

John G. Fernald; Assessing the Link between Public Capital and Productivity; Jun. 1999; The American Economic Review; vol. 89; pp. 619-638.*

Adil Abdulali, Leslie Rahl and Eric Weinstein, Phantom Prices & Liquidity: The Nuisance of Translucence; 9 pp. A paper. www.eric-weinstein.net/Papers/Nuisance_of_Translucence.pdf.*
Bias ratio (finance), Wikipedia, full article, downloaded Dec. 9, 2009.*
The Shape of Fraud, Abstract, Columbia University Seminar, Apr. 24, 2006, Page from Columbia Univiersity Web site, Speaker—Adil Abdulali, Protégé Partners.*
Adil Abdulali, Leslie Rahl and Eric Weinstein, Phantom Prices & Liquidity: The Nuisance of Translucence; 2002, 9 pp. A paper. www.eric-weinstein.net/Papers/Nuisance_of_Translucence.pdf.*
Adil Abdulali and Eric Weinstein; Hedge fund transparency: quantifying valuation bias for illiquid assets; www.risk.net; Jun. 2002 Risk. Risk Management for Investors, pp. S25-S28.*
Marilyn Seastrom, Steve Kaufman, Ralph Lee; Evaluating the Impact of Imputations for Item Nonresponse, 2002; National Center for Education Statistics—http://nces.ed.gov; Entire Paper. NCES Statistical Standards nces.ed.gov/statprog/2002/appendixb.asp.*
PCT Int'l Search Report, Apr. 9, 2008, PCTUS07/84914.
Andrew W. Lo, *Risk Management for Hedge Funds: Introduction and Overview*, First Draft: Nov. 2, 2000.
Adil Abdulali, Leslie Rahl and Eric Weinstein, CMRA *Phantom Prices & Liquidity: The Nuisance of Translucence*.
G.M. Ljung, G.E.P. Box *On a measure of lack of fit in time series models* Biometrika, pp. 297-303, 1978.
Mila Getmansky *What Drives Hedge Fund Returns? Models of Flows, Autocorrelation, Optimal Size, Limits of Arbitrage and Fund Failures*, May 2004.
Eric Weinstein, Adil Abdulali, *Hedge Fund Transparency: Quantifying Valuation Bias for Illiquid Assets* www.Risk.Net vol. 15, No. 6 Jun. 2002.

* cited by examiner

*Primary Examiner* — Charles Kyle
*Assistant Examiner* — Siegfried E Chencinski
(74) *Attorney, Agent, or Firm* — Morgan, Lewis & Bockius LLP

(57) ABSTRACT

Methods are provided for detecting price manipulation in assets by receiving data indicating returns on an asset, generating a histogram of returns data, determining a first area under a curve of the histogram in a first interval, determining a second area under the curve of the histogram in a second interval; and calculating a bias ratio which comprises a ratio based on the first area and the second area.

12 Claims, 4 Drawing Sheets

Histogram of Monthly Returns

METHOD AND SYSTEM FOR EVALUATING PRICING OF ASSETS

PRIORITY APPLICATION

This application claims the benefit of U.S. Provisional Patent Application No. 60/859,838, filed Nov. 16, 2006, titled Bias Ratio Measuring the Shape of Fraud. The entire contents of that application are incorporated herein by reference.

INTRODUCTION

Before purchasing any type of asset, investors typically conduct an assessment of the asset. This assessment typically considers certain statistics of the asset such as purchase price, historic and predicted returns, periodic growth, periodic dividends, Sharpe ratios, or other relevant statistics. Some assets, such as illiquid assets, can be difficult to price reliably. In such cases, prices may be obtained from various sources, including multiple dealers. Since each dealer can provide a different price, and the prices may vary widely, it can be difficult to establish a true price or other statistic for such assets.

The inventions described herein overcome certain limitations in existing methods and systems for evaluating pricing of assets.

In one embodiment of the invention, a method is provided comprising: receiving data indicating at least two returns of an asset; generating a histogram of the returns data; determining a first area under a curve of the histogram in a first interval; determining a second area under the curve of the histogram in a second interval; and calculating a bias ratio wherein a numerator comprises at least the first area and a denominator comprises at least the second area. Variations of the embodiment include establishing a benchmark to compare with the bias ratio, flagging the asset if the calculated bias ratio exceeds the benchmark, the first interval is the first standard deviation of positive returns and the second interval is the first standard deviation of negative returns, the returns in the first interval are positive returns and the returns in the second interval are negative returns. In some embodiments, the bias ratio is an indicator of reliability of the data and can be calculated using the formula:

$$BR = BiasRatio = \frac{\text{Count}(r_i):r_i\varepsilon[0,+1.0\sigma]}{K+\text{Count}(r_i):r_i\varepsilon[-1.0\sigma,0]},$$

where $r_i$ is a return and K is a constant, or the formula:

$$BR = \frac{\int_0^{1.0\sigma} r\,dr}{K+\int_{-1.0\sigma}^0 r\,dr},$$

where r is a function representing the distribution of returns and K is a constant.

In another embodiment of the invention, a method is provided comprising: calculating a first area of a first interval of a histogram of returns data indicating at least two returns of an asset; wherein the returns in the first interval are positive; calculating a second area of a second interval of the histogram of the returns data, wherein the returns in the second interval are negative; and determining a bias ratio based on the first area and second area. Variations of the embodiment include that the bias ratio numerator comprises at least the first area and the bias ratio denominator comprises at least the second area, the first interval is a first standard deviation of positive returns and the second interval is a first standard deviation of negative returns.

In another embodiment of the invention, a method is provided comprising: receiving data indicating at least two returns of an asset; obtaining a first count of a number of data in a first interval; obtaining a second count of a number of data in a second interval; and calculating a bias ratio wherein a numerator comprises the first count and a denominator comprises the second count. Variations of the embodiment include establishing a benchmark to compare with the bias ratio, flagging the asset if the calculated bias ratio exceeds the benchmark, the first interval is a first standard deviation of positive returns and the second interval is a first standard deviation of negative returns, and the returns in the first interval are positive returns and the returns in the second interval are negative returns.

In another embodiment of the invention, a ratio for verifying an asset return is provided comprising: a first area divided by the sum of a second area and a small, positive constant, the first area and second area being areas under a curve of a histogram of asset returns in two adjacent intervals. Variations of the ratio include that the two adjacent intervals comprise a first standard deviation of positive returns and a first standard deviation of negative returns, and the returns in the first interval are positive returns and the returns in the second interval are negative returns.

DETAILED DESCRIPTION

Figure 1:
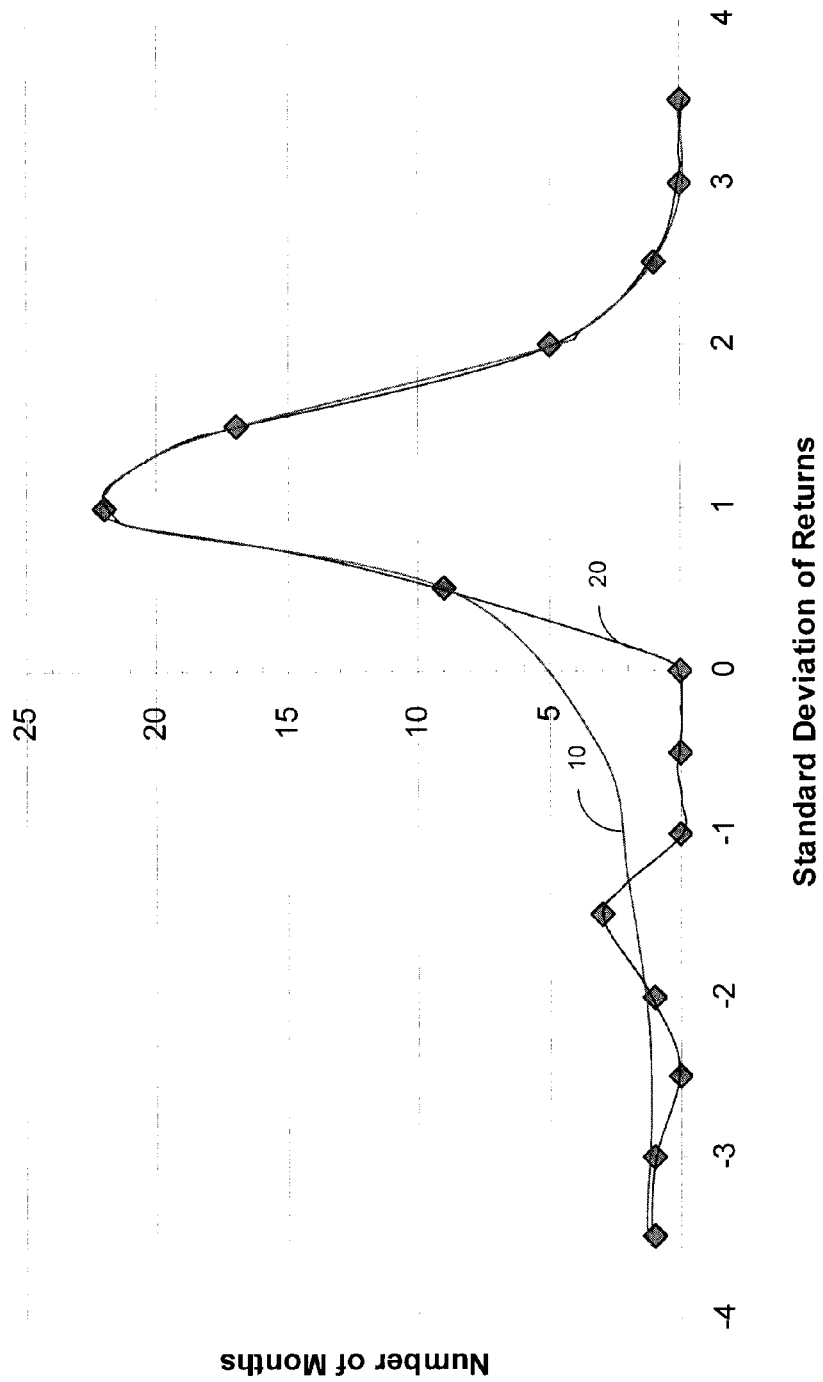
FIG. 1 depicts two histograms of monthly returns.

Embodiments of the invention relate to evaluating asset statistics, such as an asset price or return. Although not specifically described in the examples, the invention may be equally applied to any type of statistics which may be manipulated or for which uncertainties may exist.

Some investment portfolios may not be reliably priced because underlying assets may not have a definitive market quote and a source of price or other asset data may not be transparent. For such assets, price can be obtained by polling dealers; and the prices received from the dealers can be used to calculate returns. However, the poll dealer's prices may vary widely. For example, Table 1 lists the minimum, maximum and average prices for several quotes obtained on seventeen securities. As indicated in the last column, the quotes have a range as high as nearly 70%.

TABLE 1

Translucent Pricing MBO - 2000 Year End Dealer Quotes

| | Security | # Quotes | Min | Avg | Max | Range % |
|---|---|---|---|---|---|---|
| 1 | FHR 2064 G | 5 | 54.31 | 78.47 | 85.62 | 39.90% |
| 2 | FNR 99-15 SB | 4 | 80.05 | 86.78 | 91.25 | 12.91% |
| 3 | FHR 2131 SH | 4 | 73.86 | 76.21 | 78.18 | 5.67% |

TABLE 1-continued

Translucent Pricing MBO - 2000 Year End Dealer Quotes

| | Security | # Quotes | Min | Avg | Max | Range % |
|---|---|---|---|---|---|---|
| 4 | FHR 2136 SD | 4 | 74.61 | 77.84 | 80.76 | 7.90% |
| 5 | FNR 98-52 SA | 5 | 78.20 | 81.57 | 86.05 | 9.62% |
| 6 | FHR 2156 TS | 5 | 78.94 | 88.33 | 94.30 | 17.39% |
| 7 | FHR 2138 SB | 5 | 82.36 | 88.24 | 92.30 | 11.26% |
| 8 | GNR 00-7 ST | 5 | 98.13 | 103.88 | 109.36 | 10.81% |
| 9 | FNR 00-6 SK | 5 | 99.30 | 108.17 | 115.03 | 14.55% |
| 10 | FHR 2122 SD | 5 | 5.34 | 6.05 | 7.52 | 35.89% |
| 11 | FHR 2138 KS | 5 | 4.73 | 5.12 | 6.19 | 28.36% |
| 12 | FHR 2145 MS | 5 | 3.88 | 4.61 | 5.28 | 30.46% |
| 13 | FHR 2136 S | 5 | 5.27 | 5.77 | 7.22 | 33.86% |
| 14 | GNR 99-11 SC | 5 | 3.77 | 4.71 | 5.33 | 33.21% |
| 15 | GNR 99-30 SA | 6 | 4.25 | 4.87 | 7.66 | 69.96% |
| 16 | GNR 00-1 SD | 5 | 0.58 | 0.68 | 0.84 | 38.78% |
| 17 | GNR 99-40 SB | 5 | 1.95 | 2.36 | 2.83 | 37.09% |
| | Portfolio Millions | | 4.451 | 4.970 | 5.510 | 21.32% |

To price a portfolio, such as one based on the securities listed in Table 1, standard market practice allows a manager to discard any price outliers, average the remaining prices of each security, and sum the values of the priced securities. Outliers are not necessarily strictly defined and may be subject to a heuristic rule that "you know it when you see it." Visible outliers may be an indication of the particular security's characteristics and liquidity as well as the market environment in which quotes are solicited, or the outlier may simply be a data error. After discarding outliers, the value of a security may be obtained by averaging the remaining price quotes. The total value of the portfolio, which is referred to as Net Asset Value ("NAV") is obtained by summing the individual security values.

NAV is typically calculated at the end of every business day. The change in NAV at the end of a period, such as a month, after adjustment for capital flows into and out of the fund, determines whether the fund has had a gain or loss for that period. This determination is critical to the success of the fund. It is also a determination that can be manipulated. Consider, for example, one NAV calculation obtained after discarding no outliers (or only some outliers) that results in a small loss for the period, e.g., −0.01%. A review of the quotes used to obtain this NAV may show that the pricing calculation included a dealer quote that was 50% below all the other prices for a particular security. Removing that single quote as an outlier could raise the return for that period to +0.01%. In this scenario, an investment manager can either use the first calculation (Option 1, in which the outlier was not discarded) resulting in a loss or use the second calculation (Option 2, in which the outlier was discarded) showing a gain, and optionally document a reason for discarding the outlier.

FIG. 1 depicts two histograms 10 and 20 based on calculations using Options 1 (10) and 2 (20). Both histograms plot the number of months that the return on a portfolio fell within one or more standard deviations ($\sigma$) above or below zero. As is well known, the standard deviation is the root mean square (RMS) deviation of values, in this case, the returns, from their arithmetic mean. The smooth histogram 10 plots the distribution of returns calculated using Option 1, and the kinked histogram 20 plots the distribution of returns calculated using Option 2. Since typical investment managers wish to present a fund that has consistent positive returns, return distributions are often generated along the lines of histogram 20. Calculations using Option 2 typically produce more small positive results and fewer small negative returns than calculations that use Option 1.

As shown in FIG. 1, significant inconsistencies between the plots of histograms 10 and 20 are manifested in the hump at the −1.5 Standard Deviation point and in a gap between the two plots in the interval −1$\sigma$ to 0.0. Although calculations using Option 2 compared to Option 1 may not individually, or collectively, misrepresent return volatility, recent financial history has shown that hiding small losses (by discarding certain outliers) can eventually lead to large losses, e.g., the Sumitomo copper affair as well as the demise of Barings.

The area in the returns histograms of FIG. 1 between the two lines of histograms 10 and 20 represents the difference in calculations generated with price manipulations. One way to determine whether price manipulations have occurred is to model or approximate the area between the two lines. Since this area, in particular, in the interval of the histogram between −1.0$\sigma$ and zero can be difficult to model precisely, behavior induced modifications may be manifested in a shape of the returns histogram in the intervals around zero.

Figure 2:
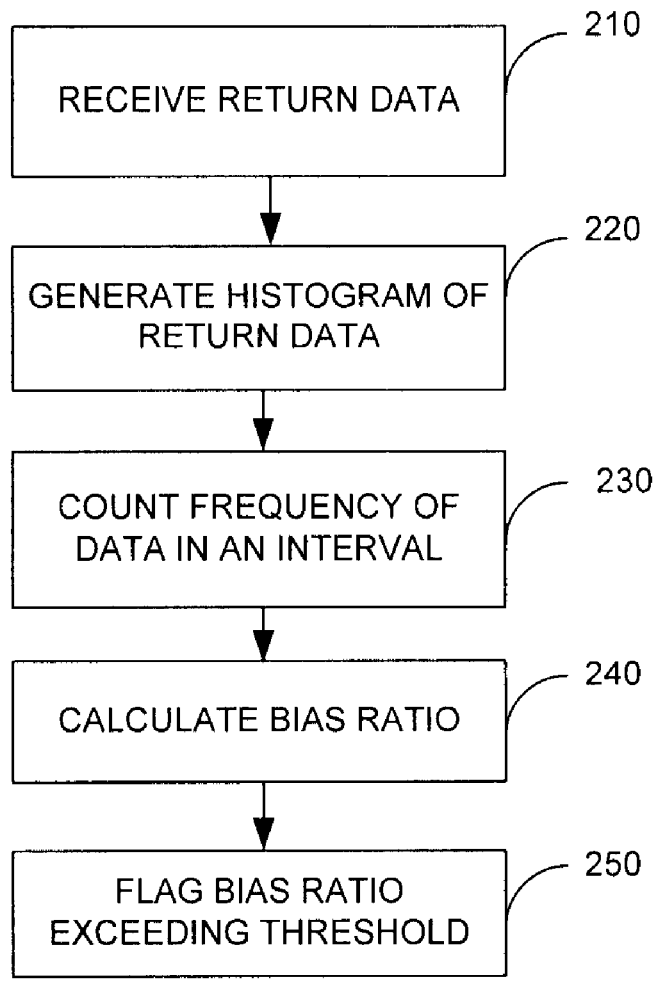
FIG. 2 depicts a flow diagram of a method according to an embodiment of the invention.

In accordance with one embodiment of the invention, one test for detecting price manipulation manifested in a returns histogram is a counting test. A flow chart depicting one such test is set forth in FIG. 2. As shown in FIG. 2, returns data are received at step 210, and are processed at step 220 to obtain a mean and a standard deviation. Next, at step 230, the number of times the return falls within one standard deviation above zero and the number of times the return falls within one standard deviation below zero are counted. For example, a first count is obtained for all results in the interval from zero to +1$\sigma$, as well as a second count for all results in the interval from zero to −1$\sigma$. A Bias Ratio is then obtained at step 240 by forming a quotient from the first and second counts.

The Bias Ratio is used as an indicator of price manipulation. Typically, higher Bias Ratios indicate that manipulation is likely to have occurred. Therefore, a Bias Ratio threshold may be established against which the calculated Bias Ratio is compared at step 250. When the Bias Ratio exceeds the threshold, the returns data is flagged as likely to have been manipulated.

A mathematical formulation for the Bias Ratio is as follows:

Let: [0.0, +1.0$\sigma$]=the closed interval from zero to +1 standard deviation of returns (including zero)

Let: [−1.0$\sigma$, 0.0)=the half open interval from −1 standard deviation of returns to zero (including −1.0$\sigma$ and excluding zero)

Let: $r_i$=return in month i, $1 \leq i \leq n$, and n=number of monthly returns The Bias Ratio calculated at step 140 is:

$$BR = BiasRatio = \frac{\text{Count}(r_i) : r_i \varepsilon [0, +1.0\sigma]}{K + \text{Count}(r_i) : r_i \varepsilon [-1.0\sigma, 0]},$$

where K is a small, positive, non-zero, constant used to avoid the possibility of dividing by zero.

While intervals in the above example are standard deviations from [−1.0$\sigma$ to 0) and [0 to +1.0$\sigma$], other intervals may be used as will be understood by one of skill in the art. In general, the intervals of interest are the adjacent intervals on either side of a critical value in the distribution.

The Bias Ratio approximates a ratio between an area under the returns histogram immediately above zero and the similar or corresponding area immediately below zero. The Bias Ratio typically holds the following properties:

a. $0 \leq BR \leq n$ b. If $r_i \leq 0$, $\forall i$, then BR=0 c. If $\forall r_i$ such that $r_i>0$, $r_i>1.0\sigma$ then BR=0
d. If the distribution $r_i$ is Normal with mean=0, the BR→1.0 as n→∞.

Figure 3:
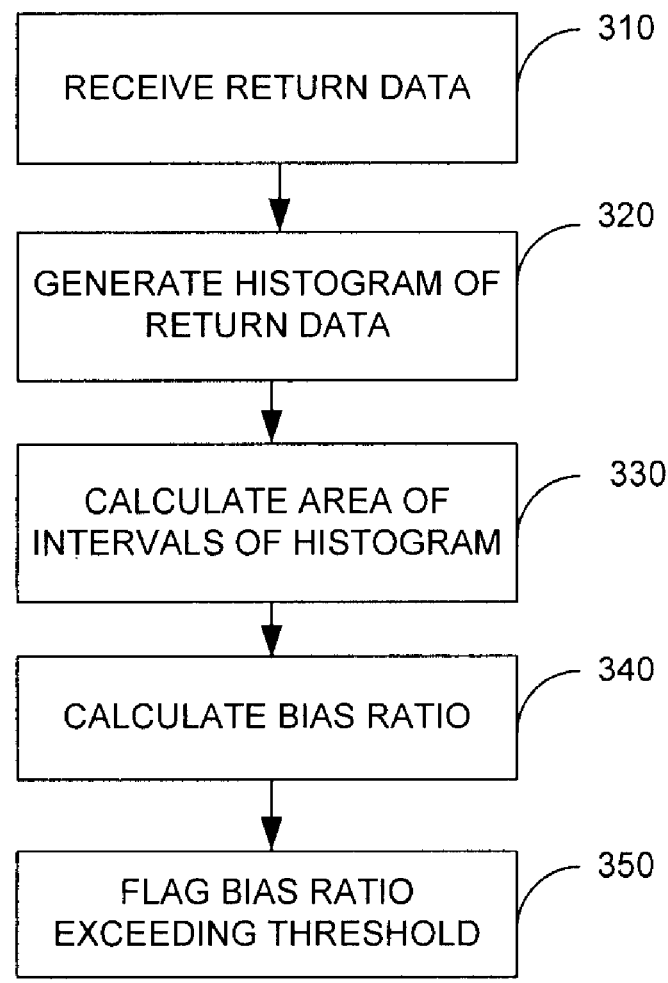
FIG. 3 depicts a flow diagram of a method according to another embodiment of the invention.

In a second embodiment, shown in the flowchart of FIG. 3, the Bias Ratio is calculated by obtaining an area in two intervals of a returns histogram. As shown in FIG. 3, returns data is received at step 310, and is processed at step 320 to obtain a mean and a standard deviation. The returns data is used to generate a histogram and a distribution function r is fitted to the histogram data. The area under the distribution function is calculated at step 330 for two intervals, one immediately above zero and the other immediately below zero. The Bias Ratio is determined at step 340 according to the formula:

$$BR = \frac{\int_0^{1.0\sigma} r\, dr}{K + \int_{-1.0\sigma}^0 r\, dr},$$

where K is a small, positive, non-zero, constant used to avoid the possibility of dividing by zero.

As described previously, the Bias Ratio can be used as an indication of price manipulation. Thus, at step 350, the calculated Bias Ratio is compared with a threshold Bias Ratio and the fund returns are flagged if the Bias Ratio exceeds the threshold.

The Bias Ratio defined by a $1\sigma$ interval around zero can work well to discriminate pricing, returns and other statistics among hedge funds. Other intervals may be used to provide metrics with varying resolutions.

Figure 4:
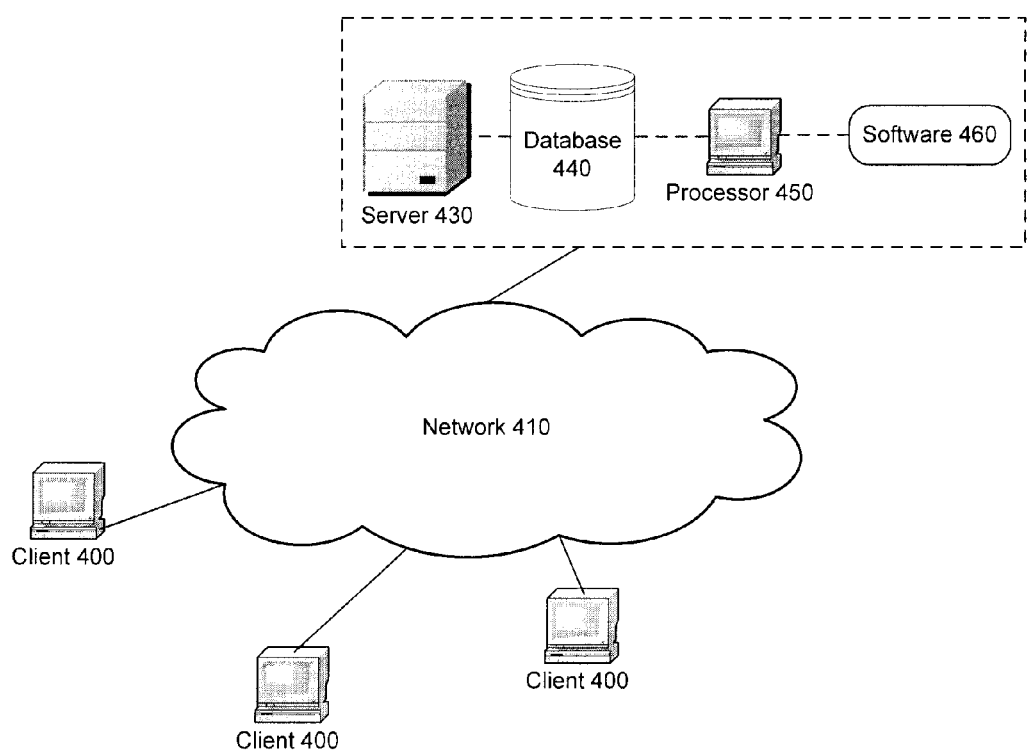
FIG. 4 depicts a block diagram of a computer system for providing a method according to an embodiment of the invention.

Inventions described herein may be automated and used in the exemplary system of FIG. 4. As shown, client computers 400 communicate via network 410 with a central server 430 which is coupled to one or more databases 440, one or more processors 450, and software 460. Other components and combinations of components may also be used to support Bias Ratio or other calculations described herein as will be evident to one of skill in the art. Server 430 facilitates communication of returns data from a database 440 to and from clients 400. Processor 450 provides calculations relevant to calculating a Bias Ratio, or other financial calculations. Software 460 can be installed locally at a client 400 and/or centrally supported for facilitating Bias Ratio calculations and applications. For example, software 460 may be used in embodiments where a threshold for a Bias Ratio is established.

Examples of Bias Ratio calculations for indices are presented in Table 2. Table 2 includes data relating to numerous indices, including an annualized average return, an associated Sharpe ratio, a Standard Deviation and Bias Ratio. Calculations included in Table 2 are based on monthly data over a time period greater than 9 years with the exception of the Hennessee H.F. High Yield index which includes data spanning 7.5 years.

TABLE 2

Bias Ratios: Indices

| Index | Annualized Average (geom) | Sharpe ratio | Standard Deviation | Bias Ratio |
|---|---|---|---|---|
| NIKKEI 225 Yen Index | −3.98 | −0.41 | 20.17 | 1.13 |
| Hennessee H. F. Index EMERGING MKTS | 5.93 | 0.13 | 13.33 | 1.28 |

TABLE 2-continued

Bias Ratios: Indices

| Index | Annualized Average (geom) | Sharpe ratio | Standard Deviation | Bias Ratio |
|---|---|---|---|---|
| Lehman Aggregate Bond Composite Index | 6.80 | 0.65 | 4.00 | 1.36 |
| RUSSELL 2000 | 8.76 | 0.23 | 19.40 | 1.36 |
| JP Morgan EMBI+ Composite | 11.27 | 0.39 | 17.99 | 1.53 |
| Lehman Government Index | 6.95 | 0.60 | 4.57 | 1.55 |
| MSCI $ World DRI Index | 7.19 | 0.21 | 14.42 | 1.55 |
| S&P 500 DRI | 10.35 | 0.40 | 15.45 | 1.56 |
| HENNESSEE H. F. INDEX | 10.15 | 0.83 | 7.13 | 1.71 |
| Hennessee H. F. INDEX FIXED INCOME | 5.73 | 0.25 | 6.12 | 2.12 |
| CSFB High Yield Index Value | 8.21 | 0.63 | 6.35 | 2.15 |
| Lehman Aggregate Bond - Mortgage Backed Securities Index | 6.79 | 0.83 | 3.12 | 2.16 |
| Hennessee H. F. Index HIGH YIELD | 4.43 | 0.03 | 7.20 | 2.18 |
| Hennessee H. F. Index DISTRESSED ONLY | 12.28 | 1.30 | 6.22 | 2.61 |
| Hennessee H. F. Index FINANCIAL EQUITIES | 13.56 | 0.76 | 12.30 | 2.64 |
| Hennessee H. F. Index EVENT DRIVEN | 13.13 | 1.26 | 7.10 | 2.65 |
| Hennessee H. F. Index CONVERTIBLE ARB. | 8.83 | 1.17 | 3.95 | 5.00 |

Generally, assets with a high Sharpe ratio are considered to provide greater return per risk. When compared to the Bias Ratio results of Table 2, there is a correlation between a high Sharpe ratio and an increasing Bias Ratio.

Bias Ratios of market and hedge fund indices give some insight into a natural shape of returns near zero. Theoretically, demand for markets with normally distributed returns around a zero mean may not be expected. Such markets typically have distributions with a Bias Ratio of less than 1.0. Major market indices support this trend and have Bias Ratios generally greater than 1.0 over long time periods. The returns of equity and fixed income markets as well as alpha generating strategies have a natural positive skew of returns which provide a smoothed histogram as a positive slope near zero. Fixed income strategies with a relatively constant positive return ("carry") also exhibit total return series with a naturally positive slope near zero. Cash investments such as 90-day T-Bills have large Bias Ratios (i.e., that risk is relatively low), since they generally do not experience periodic negative returns. Consequently, the Bias Ratio is less reliable for hedge funds that have an unleveraged portfolio with a high cash balance.

Bias Ratios vs. Sharpe Ratios

The Sharpe ratio measures risk-adjusted returns, and valuation biases are expected to understate volatility. An unexpectedly high Sharpe ratio may be a flag for skeptical practitioners to detect smoothing. (Weisman, Andrew, "Dangerous Attractions: Informationless Investing and Hedge Fund Performance Measurement Bias", 2002, Journal of Portfolio Management.) Data may not support a strong statistical relationship between a high Bias Ratio and a high Sharpe ratio. High Bias Ratios exist in strategies that have traditionally exhibited high Sharpe ratios, but many assets have high Bias Ratios and low Sharpe ratios.

The Bias Ratio and Serial Correlation

Hedge fund investors can use serial correlation (autocorrelation) to detect smoothing in hedge fund returns. Market frictions such as transaction costs and information processing costs that cannot be arbitraged may lead to serial correlation. Stale prices for illiquid assets may have the same effect.

Managed prices can also be a cause for serial correlation. As mentioned previously, fund managers of illiquid, hard to price assets, may use some leeway to calculate a fund's NAV. When returns are smoothed by marking securities conservatively in the good months and aggressively in the bad months a manager may add a serial correlation as a side effect. The more liquid a fund's securities, the less leeway the manager has to make up numbers. (Lo, Andrew W.; "Risk Management For Hedge Funds: Introduction and Overview", White Paper, June, 2001.)

One common measure of serial correlation is the Ljung-Box Q-Statistic. (Ljung, G. M.; Box, G. E. P.; "On a measure of lack of fit in time series models", Biometrika, 65, 2, pp. 297-303. 1978.) The p-values of the Q-statistic establish the significance of the serial correlation. (Chan, Nicholas; Getmansky, Mila; Haas, Shane M.; Lo, Andrew; "Systemic Risk and Hedge Funds", 2005, NBER Draft, Aug. 1, 2005.) The Bias Ratio compared to the serial correlation metric gives different results. Table 3 includes calculations of certain funds, including the Safe Harbor Fund and Bayou Fund, and for each fund, an annualized average, Sharpe ratio, Standard Deviation, Bias Ratio and PVQ6(a p-value Ljung Box Q Statistic of order 6). The Safe Harbor Fund and Bayou Fund are recent examples of funds that have had valuation problems. (SEC Litigation Release No. 18950, Oct. 28, 2004 and SEC Litigation Release No. 19692, May 9, 2006).

However, Bias Ratios can be calculated at the manager level and then aggregated to create useful benchmarks.

Variability of Bias Ratios for Different Strategies

Funds that employ illiquid assets can have Bias Ratios that are significantly higher than the Bias Ratios of indices representing the underlying asset class. For example, most equity indices have Bias Ratios falling between 1.0 and 1.5. In one sample of funds, equity hedge funds had Bias Ratios ranging from 0.3 to 3.0 with an average of 1.29 and standard deviation of 0.5. On the other hand, the Lehman Aggregate MBS Index has a Bias Ratio of 2.16, while MBS hedge funds in the sample have Bias Ratios from 1.7 to 31.0, with an average of 7.7 and standard deviation of 7.5. Ceteris paribus, a high Bias Ratio for an equity based strategy might be unremarkable for an MBS strategy. Calculations for such funds are shown in Table 4:

TABLE 4

Bias Ratio: Strategy Benchmarks

|  | Sample Size | Average | Median | 75th Percentile | Max | Min | Stdev |
|---|---|---|---|---|---|---|---|
| MBS | 23 | 7.7 | 4.0 | 9.3 | 31.0 | 1.7 | 7.5 |
| Distressed | 32 | 4.4 | 3.2 | 4.6 | 16.5 | 1.0 | 3.8 |

TABLE 3

Period: January 1995-November 2005

| Name | Annualized Average (geom) | Sharpe Ratio | Standard Deviation | Bias Ratio | PVQ6 |
|---|---|---|---|---|---|
| Hennessee H. F. Index CONVERTIBLE ARB. | 10.24% | 1.81 | 3.55% | 3.73 | 0.00% |
| Sun Asia Opportunities Fund, LLC | 7.86% | 0.28 | 14.48% | 1.67 | 0.02% |
| JASDAQ | 5.21% | 0.05 | 29.70% | 0.84 | 0.11% |
| Bayou Funds | 16.89% | 1.21 | 10.77% | 5.54 | 0.59% |
| Safe Harbor Fund LP | 16.29% | 3.03 | 4.11% | 7.00 | 2.18% |
| Plank Global Value Fund, LP | 15.46% | 1.25 | 9.31% | 2.00 | 4.72% |
| Sensex - Mumbai Sensex 30 Index | 7.66% | 0.15 | 26.02% | 0.86 | 4.75% |
| Russell 2000 Value Index | 13.20% | 0.63 | 14.96% | 1.75 | 5.25% |
| RUSSELL 2000 | 11.01% | 0.37 | 19.54% | 1.53 | 10.76% |
| CSFB High Yield Index Value | 7.96% | 0.67 | 6.16% | 2.06 | 12.24% |
| S&P 500 Total Return | 11.49% | 0.51 | 15.16% | 1.67 | 71.07% |
| NIKKEI 225 Yen Index | −2.55% | −0.32 | 19.62% | 1.21 | 94.56% |

Serial correlations appear in many cases that are likely not the result of willful manipulation but rather the result of stale prices and illiquid assets. Both Sun Asia and Plank (fictitious names are used to represent real hedge funds) are emerging market hedge funds with NAVs based on objective prices. However, both funds show significant serial correlation. The presence of serial correlation in several market indices such as the JASDAQ and the SENSEX indicates that serial correlation might not be suitable for uncovering price manipulation. However two known problematic funds, namely Bayou, an Equity fund, and Safe Harbor, an MBS fund have relatively high calculated Bias Ratios which stand out from Bias Ratios of other funds. In contrast, Sharpe ratios and PVQ6 for the Bayou fund and Safe Harbor fund do not stand out in comparison with the other funds. Thus, the Bias Ratio provides price manipulation indication which other known risk indicators miss.

Benchmark Bias Ratios by Hedge Fund Strategies

Some hedge fund strategy indices may not generate benchmark Bias Ratios because aggregated monthly returns can mask individual manager behavior, e.g., pricing decisions.

TABLE 4-continued

Bias Ratio: Strategy Benchmarks

|  | Sample Size | Average | Median | 75th Percentile | Max | Min | Stdev |
|---|---|---|---|---|---|---|---|
| Convertible | 53 | 3.3 | 2.7 | 4.4 | 10.0 | 0.6 | 2.1 |
| Equity | 133 | 1.3 | 1.2 | 1.6 | 3.0 | 0.3 | 0.5 |
| CTA | 46 | 1.0 | 1.0 | 1.2 | 1.9 | 0.6 | 0.3 |

Uses of the Bias Ratio

Investors ideally examine prices of each individual underlying asset that comprises a manager's portfolio, or other priced assets. However, in the case of limited price transparency, and time and effort, investors may not have access to price or other statistical information. The Bias Ratio provides an efficient method to highlight pricing problems. The Bias Ratio can be used to differentiate among a universe of funds and assets. If a fund has a Bias Ratio above a certain benchmark, median level or other threshold, closer inspection of the assets, pricing policy, and other supporting information may be warranted; whereas, well below the median might warrant only a cursory inspection.

The Bias Ratio can also be useful to detect illiquid assets forensically. For example, if a database search for Long/Short Equity managers reveals a fund with a reasonable history and a Bias Ratio greater than 2.5, detailed diligence will likely reveal some fixed income or highly illiquid equity investments in the portfolio.

The Bias Ratio can provide an indication of a) illiquid assets in a portfolio combined with b) a subjective pricing policy. Most valuation-related hedge fund debacles have exhibited high Bias Ratios. However, the converse may not always be true.

It will be appreciated that the present invention has been described by way of example only, and that the invention is not to be limited by the specific embodiments described herein. Improvements and modifications may be made to the invention without departing from the scope or spirit thereof.

Embodiments of the present invention comprise computer components and computer-implemented steps that will be apparent to those skilled in the art. For example, calculations and communications can be performed electronically, and agreements can be composed, transmitted and executed electronically.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

What is claimed is:

1. A system comprising:
  memory operable to store at least one program; and
  at least one processor communicatively coupled to the memory, in which the at least one program, when executed by the at least one processor, causes the at least one processor to:
  receive data indicating at least two returns of an investment portfolio comprising one or more assets, said returns being calculated on a periodic basis and indicating a gain or loss for the investment portfolio for each period;
  generate a histogram of the returns data by plotting the returns data on one axis of the histogram against a standard deviation of the returns data on a second axis of the histogram;
  determine a first area under a curve of the histogram in a first interval comprising a positive standard deviation of the returns;
  determine a second area under the curve of the histogram in a second interval comprising a negative standard deviation of the returns;
  calculate a bias ratio wherein a numerator of the bias ratio comprises the first area and a denominator of the bias ratio comprises the second area; and
  analyze the calculated bias ratio to determine reliability of the returns data wherein the bias ratio is calculated using the formula:

$$BR = BiasRatio = \frac{\text{Count}(r_i): r_i \varepsilon [0, +1.0\sigma]}{K + \text{Count}(r_i): r_i \varepsilon [-1.0\sigma, 0]},$$

where $r_i$ is a return, $\sigma$ represents standard deviation, K is a positive, non-zero constant, and $\varepsilon$ indicates that $r_i$ is within the closed interval $[0,+1.0\sigma]$ in the case of the numerator and within the half open interval $[-1.0\sigma,0)$ in the case of the denominator.

2. A system comprising:
  memory operable to store at least one program; and
  at least one processor communicatively coupled to the memory, in which the at least one program, when executed by the at least one processor, causes the at least one processor to:
  receive data indicating at least two returns of an investment portfolio comprising one or more assets, said returns being calculated on a periodic basis and indicating a gain or loss for the investment portfolio for each period;
  generate a histogram of the returns data by plotting the returns data on one axis of the histogram against a standard deviation of the returns data on a second axis of the histogram;
  determine a first count of a number of data in a first interval comprising a positive standard deviation of the returns;
  determine a second count of a number of data in a second interval comprising a negative standard deviation of the returns; and
  calculate a bias ratio wherein a numerator of the bias ratio comprises the first count and a denominator of the bias ratio comprises the second count; and
  analyze the calculated bias ratio to determine reliability of the returns data wherein the bias ratio is calculated using the formula:

$$BR = BiasRatio = \frac{\text{Count}(r_i): r_i \varepsilon [0, +1.0\sigma]}{K + \text{Count}(r_i): r_i \varepsilon [-1.0\sigma, 0]},$$

where $r_i$ is a return, $\sigma$ represents standard deviation, K is a positive, non-zero constant, and $\varepsilon$ indicates that $r_i$ is within the closed interval $[0,+1.0\sigma]$ in the case of the numerator and within the half open interval $[-1.0\sigma,0)$ in the case of the denominator.

3. The system of claim 1 wherein one or more of the one or more assets in the investment portfolio are valued with reference to subjective criteria.

4. The system of claim 2 wherein one or more of the one or more assets in the investment portfolio are valued with reference to subjective criteria.

5. The system of claim 1 wherein the positive standard deviation of returns and the negative standard deviation of returns is up to 1.0 standard deviation.

6. The system of claim 2 wherein the positive standard deviation of returns and the negative standard deviation of returns is up to 1.0 standard deviation.

7. A system comprising:
  memory operable to store at least one program; and
  at least one processor communicatively coupled to the memory, in which the at least one program, when executed by the at least one processor, causes the at least one processor to:
  receive data indicating at least two returns of an investment portfolio comprising one or more assets, said returns being calculated on a periodic basis and indicating a gain or loss for the investment portfolio for each period;

generate a histogram of the returns data by plotting the returns data on one axis of the histogram against a standard deviation of the returns data on a second axis of the histogram;

determine a first area under a curve of the histogram in a first interval comprising a positive standard deviation of the returns;

determine a second area under the curve of the histogram in a second interval comprising a negative standard deviation of the returns;

calculate a bias ratio wherein a numerator of the bias ratio comprises the first area and a denominator of the bias ratio comprises the second area; and analyze the calculated bias ratio to determine reliability of the returns data wherein the bias ratio is calculated using the formula:

$$BR = \frac{\int_0^{1.0\sigma} rdr}{K + \int_{-1.0\sigma}^{0} rdr},$$

where r is a function representing a distribution of returns (dr), σ represents standard deviation and K is a positive, non-zero constant.

8. A system comprising:

memory operable to store at least one program; and at least one processor communicatively coupled to the memory, in which the at least one program, when executed by the at least one processor, causes the at least one processor to:

receive data indicating at least two returns of an investment portfolio comprising one or more assets, said returns being calculated on a periodic basis and indicating a gain or loss for the investment portfolio for each period;

generate a histogram of the returns data by plotting the returns data on one axis of the histogram against a standard deviation of the returns data on a second axis of the histogram;

determine a first count of a number of data in a first interval comprising a positive standard deviation of the returns;

determine a second count of a number of data in a second interval comprising a negative standard deviation of the returns; and calculate a bias ratio wherein a numerator of the bias ratio comprises the first count and a denominator of the bias ratio comprises the second count; and analyze the calculated bias ratio to determine reliability of the returns data wherein the bias ratio is calculated using the formula:

$$BR = \frac{\int_0^{1.0\sigma} rdr}{K + \int_{-1.0\sigma}^{0} rdr},$$

where r is a function representing a distribution of returns (dr), σ represents standard deviation and K is a positive, non-zero constant.

9. The system of claim 7 wherein one or more of the one or more assets in the investment portfolio are valued with reference to subjective criteria.

10. The system of claim 8 wherein one or more of the one or more assets in the investment portfolio are valued with reference to subjective criteria.

11. The system of claim 7 wherein the positive standard deviation of returns and the negative standard deviation of returns is up to 1.0 standard deviation.

12. The system of claim 8 wherein the positive standard deviation of returns and the negative standard deviation of returns is up to 1.0 standard deviation.

* * * * *

UNITED STATES PATENT AND TRADEMARK OFFICE
CERTIFICATE OF CORRECTION

| | | |
|---|---|---|
| PATENT NO. | : 8,364,572 B2 | Page 1 of 1 |
| APPLICATION NO. | : 11/941218 | |
| DATED | : January 29, 2013 | |
| INVENTOR(S) | : Adil Abdulali | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Eleventh Day of November, 2014

Michelle K. Lee
*Deputy Director of the United States Patent and Trademark Office*